Jan. 6, 1959     I. H. MILLGATE     2,867,045
VISUAL INSTRUCTION AIDS
Filed Sept. 6, 1956     3 Sheets-Sheet 1
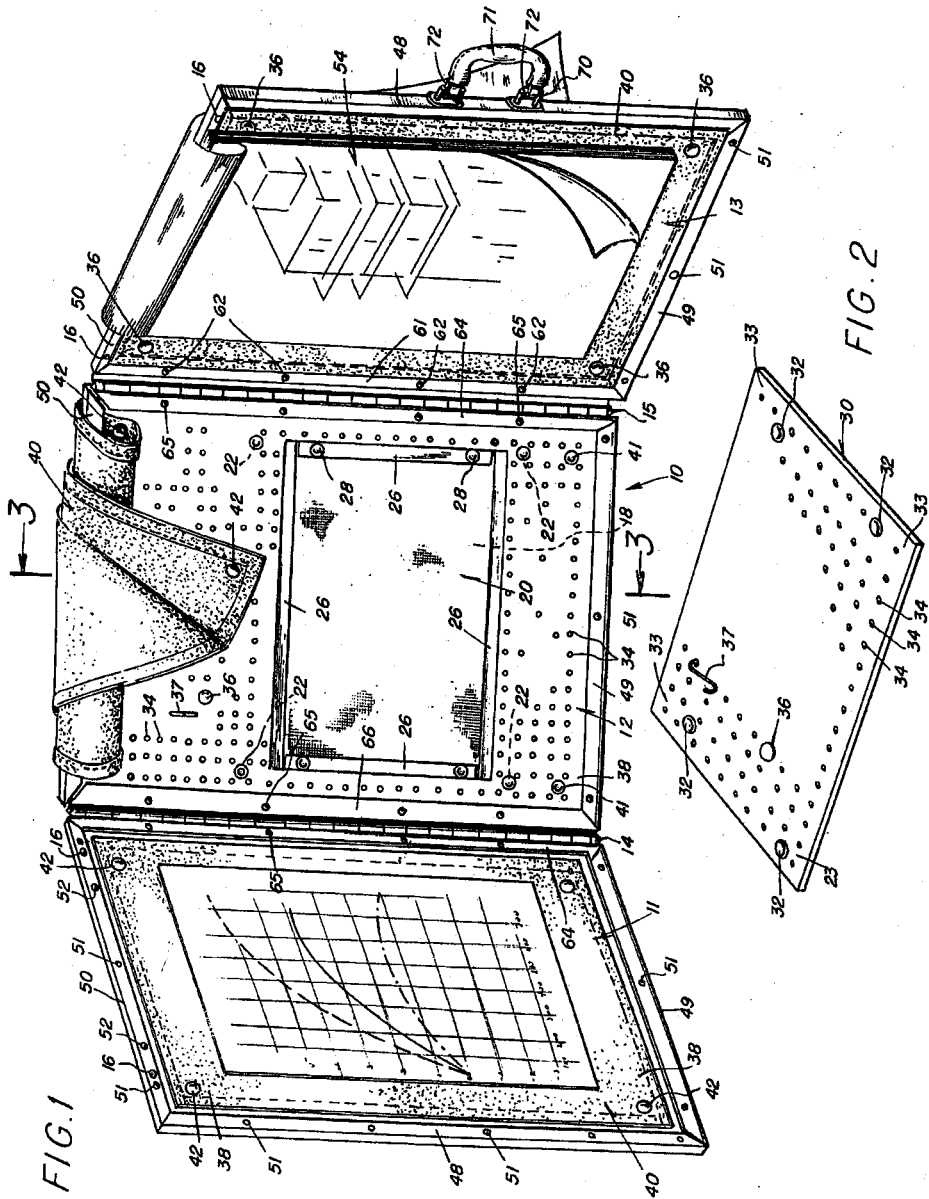

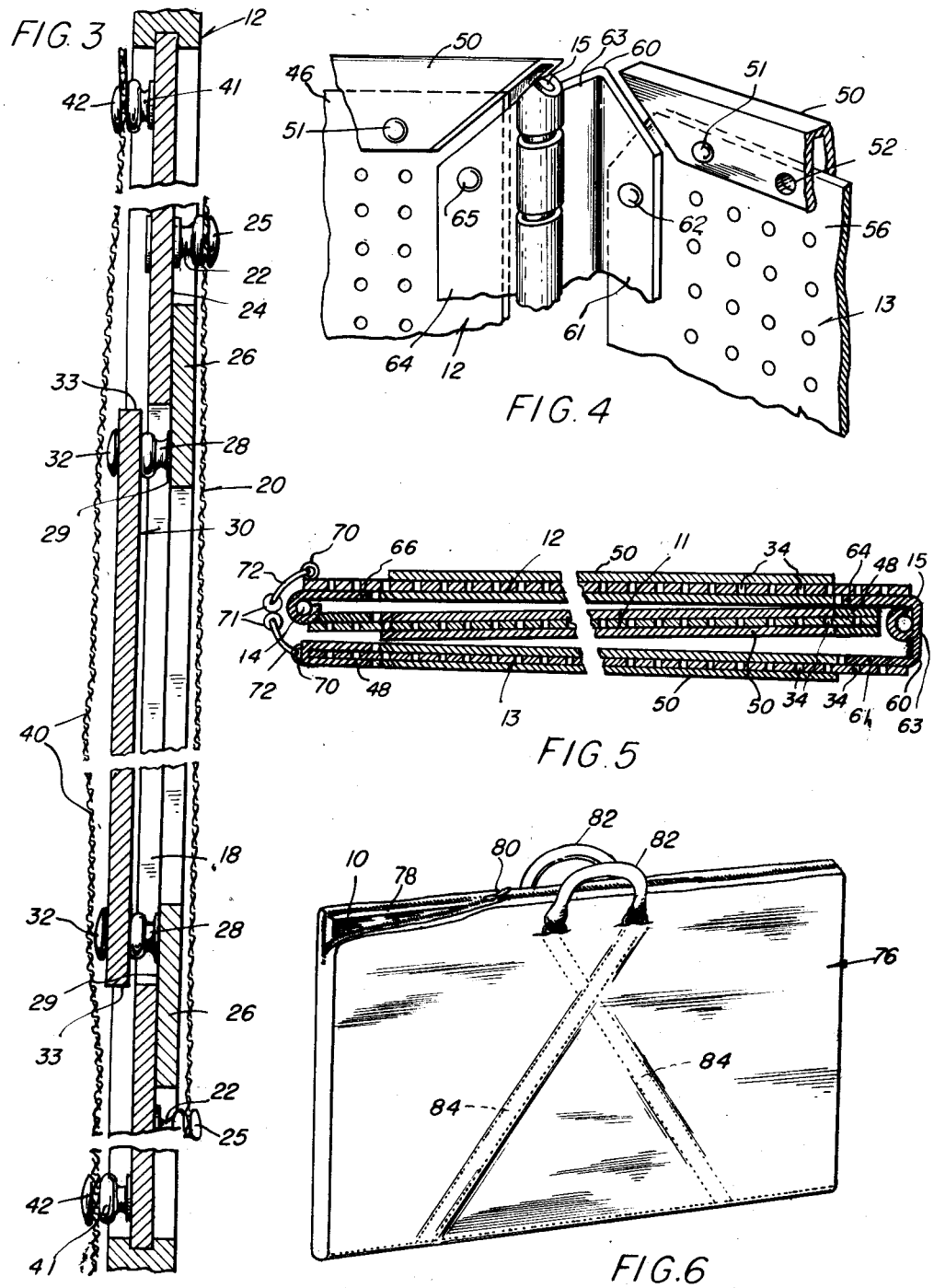

Jan. 6, 1959     I. H. MILLGATE     2,867,045
VISUAL INSTRUCTION AIDS
Filed Sept. 6, 1956     3 Sheets-Sheet 3
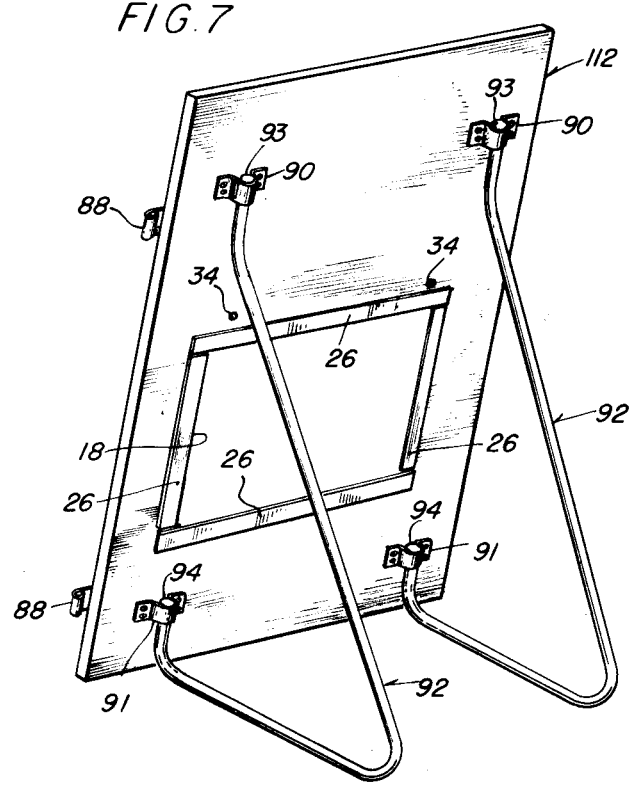
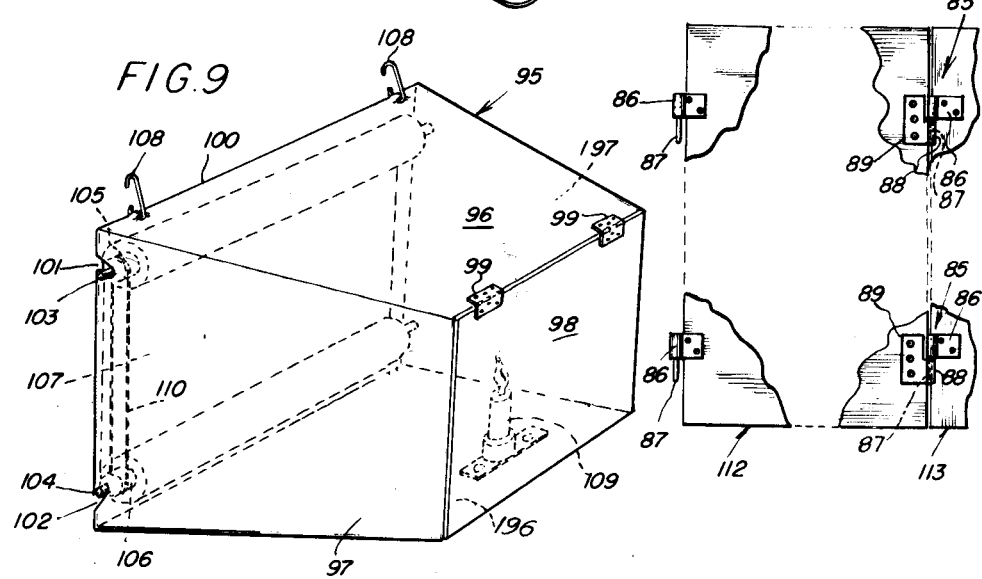

United States Patent Office 2,867,045
Patented Jan. 6, 1959

2,867,045

VISUAL INSTRUCTION AIDS

Irvine H. Millgate, New Milford, N. J.

Application September 6, 1956, Serial No. 608,369

5 Claims. (Cl. 35—60)

The present invention relates to visual instruction aids, and more particularly to instruction aids which can be used for the simultaneous presentation of several forms of visual educational material.

When presenting visual instructional material it is often useful to show the material in several different media, e. g., showing a motion picture and at the same time using a chart having pages which can be turned over to point up certain specific features of the motion picture. Therefore, a general object of the present invention is to provide a visual instruction aid in which motion pictures and corresponding display material effectively may be presented simultaneously, and by a device which is compact and may be easily transported.

A further object of the present invention is to provide for the unitary presentation of both projected images on a screen and the corresponding display of two or three-dimensional objects with the same display board device which is of such construction as to permit compact folding and which is easily set up in self-supporting fashion for effective use.

Another object of the present invention is to provide such a device which will be light in weight and readily transportable manually by an instructor.

An additional object of the present invention is to provide such a device which is readily and economically manufactured on a mass basis.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection wtih the accompanying drawings in which:

Fig. 1 is a front perspective view of one embodiment of a device of the present invention illustrating some of the manners in which it can be employed to advantage;

Fig. 2 is a front perspective view of a projection screen cover which can be mounted over the projection screen shown in the Fig. 1 embodiment;

Fig. 3 is an enlarged, detailed, sectional elevation view, taken substantially along line 3—3 of Fig. 1, with parts broken away, illustrating means for detachably mounting the projection screen, projection screen cover, and cloth board to the display board;

Fig. 4 is an enlarged, detailed, front perspective view, with parts broken away, of right-hand hinge means of the device shown in Fig. 1;

Fig. 5 is a top plan view, with parts broken away and in section, of a display board of the Fig. 1 embodiment in a folded position, showing means for carrying said display board;

Fig. 6 is an embodiment of a carrying case illustrating an alternate means for carrying said display board;

Fig. 7 is a rear elevational perspective of a central panel of another embodiment of the present invention, showing it disconnected from the right side and left side panels and supported by suitable removable brackets;

Fig. 8 is a front elevational view to a smaller scale, with parts broken away, of the central panel illustrated in Fig. 7 and with the right side panel of this embodiment shown hinged thereto; and Fig. 9 is an elevational perspective to a larger scale of a back-lighted device employable with the central panel of an embodiment of the present invention, such as that illustrated in Figs. 7 and 8.

Referring to the drawing, in which like numerals identify similar parts throughout, it will be seen that, as illustrated in Fig. 1, the apparatus may include a unitary, rigid, transportable display device 10 of light-weight material, such as aluminum, plywood, or a rigid plastic material, e. g., polystyrene, which can, if desired, be comprised of a plurality of sections or panels, such as those indicated at 11, 12 and 13. Hinge means 14 and 15 between the juxtaposed pairs of panels 11 and 12, and 12 and 13, permit the display device 10 to be folded in a compact manner, as shown in Fig. 5 to facilitate carrying it. Hinge means 14 and 15 which may be piano hinges, also permit panels 11, 12 and 13 to be placed at an oblique angle to each other, as shown in Fig. 1, thereby enabling the display device 10 to be self-supporting on a lateral surface, such as a table top, or the like. Mounting holes 16—16 may be provided for reception of hooks, etc., to permit support of the device 10 from a wall or a ceiling if an alternate means for support is desired.

An opening 18, preferably rectangular, is provided in panel 12 and a projection screen 20 for motion picture or slide projections is removably mounted across the opening by use of suitable separable fasteners which may include headed studs 22—22 located on the back face 24 of display panel 12 and on which are snapped buttons 25—25 carried by the corners of the projection screen. Brackets or strips 26—26 are lapped against and welded, riveted or otherwise affixed to the back face 24 of panel 12 with marginal zones of the strips exposed in opening 18. Additional snap fastener studs 28—28 preferably are mounted on front faces 29—29 of the exposed marginal zones of strips 26—26. A projection screen cover 30 can be removably mounted in front of or set into opening 18, such as by means of buttons 32—32 carried by the screen cover at its corners 33—33 and snapped on to the fastener studs 28—28, as shown in Fig. 3, and as in the removable mounting of screen 20 a variety of types of separable fasteners may be employed for removably securing this cover in position.

A plurality of "peg" holes or receptacles 34—34 are provided in display panels 11, 12 and 13, and preferably in a uniform pattern over most of the faces thereof, for receiving removable clips 36—36 (which may be in the form of headed split pins), hooks 37—37, or other suitable fastening means, for fastening temporarily two or three-dimensional objects directly to and supporting them on the display panels. Preferably screen cover 30 has similar holes to be used for reception of clips 36—36, hooks 37—37, etc., and also to continue the patterned appearance of the surrounding portions of panel 12.

Additional separable fasteners or similar mounting means are located near the corners 38—38 of each panel 11, 12 and 13 and can be used for removably mounting cloth display sheets or covers 40—40 of felt or flannel. Such separable fasteners may comprise headed studs 41—41 on which buttons 42—42 carried at the corners of the display sheets may be snapped. Such cloth sheets 40—40 are shown in the mounted or draped position on the left-hand panel 11 and as being turned back over the center panel 12 in the Fig. 1 illustrations, Fig. 3 illustrating drape of such cloth sheet on the center panel.

U-shaped protective molding strips 48, 48 may be slipped over and secured to the outer side edges of side panels 11 and 13, similar molding strips 49—49 may be mounted on the bottom edges of the three panels, including center panel 12, and the top edges thereof may be protected by molding strips 50—50, secured in any suitable manner such as by through rivets 51—51, or by soldering, spot-welding or the like. In the upper molding strips 50—50 may be provided apertures or other means 52—52 for detachably mounting a turn-back chart 54 by suitable fastening means, such as clips, as shown on the right-hand panel 13 of Fig. 1.

The hinge 15 between center panel 12 and right side panel 13 is provided with an extended L-shaped leaf 60, having its edge 61 lapped, as shown in detail in Fig. 4, against the face of panel 13 and suitably secured thereto, such as by rivets as indicated at 62. The remainder of hinge leaf 60, constituting zone 63 thereof disposed at right angles to edge 61, is of sufficient width to permit the free side edge of left-hand panel 11 and its molding trim 48 to be disposed between trimmed panels 12 and 13 at hinge 15 when the device is folded up in the manner proposed in Fig. 5, with panel 11 first swung inward against center panel 12 and then right-hand panel 13 swung inward over and against panel 11. The other leaf 64 of hinge 15 is lapped against the face of panel 12 and riveted thereto, as indicated at 65. The two leaves 64 and 66 of hinge 14 between left-hand panel 11 and center panel 12 are of a simple flat form like and complementary to leaf 64 of hinge 15. Leaves 64 and 66 of hinge 14, and leaf 64 and edge 61 of leaf 60 of hinge 15 preferably form inside molding or trim strips which align with face portions of U-shaped molding strips 49—49 and 50—50 to provide with U-shaped molding strips 48, 48, frames of similar appearance for the three panels 11, 12 and 13, as will be seen from Figs. 1 and 4.

Eyelets 70, 70 may be mounted on the side of U-shaped molding strip 48 on the free edge of right-hand panel 13, as shown at the right-hand end of Fig. 1 and the left-hand end of Fig. 5, to which a handle 71 can be removably attached by straps 72—72, and a similar handle 71 may be mounted to the back side of center panel 12 in the vicinity of hinge 14, thus providing light-weight means for carrying folded display device 10. Alternate means for carrying display device 10 is shown in Fig. 6 in the form of a carrying case 76, which case, if desired, may be of leather or other similar material. Carrying case 76 defines a pocket 78 in which is placed the folded display device 10. A slide fastener 80 can be employed for closing case 76 and the case is carried by loop handles 82, 82. Reinforcing straps 84, 84 stitched to the inside of case 76, shown in dotted lines in Fig. 6, help in distributing the load carried by the handles 82, 82.

The present visual instruction aid can be utilized in many different manners. Opening 18 within the central display panel 12 permits projected images to be displayed on projection screen 20 from a projector either in front of or, preferably, from behind the display device 10. At the same time two or three dimensional objects can be mounted directly on the panels 11, 12 and 13 by the use of pegs or clips 36—36 which are inserted in holes or receptacles 34—34. Display material can, if desired, be also pasted with rubber cement on cloth display sheets 40—40. In addition, if a series of illustrations are to be presented simultaneously with the motion pictures or slides, turn-back chart 54 can be used to permit the instructor to show further illustrations which point up particular features of the motion picture or slides.

In the event that neither motion pictures nor slides are being presented, projection screen cover 30 can be attached over the screen 20 by means of snap fasteners at 28—28 to permit central panel 12 to be utilized entirely for displaying objects mounted on the panel by pegs or clips 36—36 which can be inserted into holes or receptacles 34—34 in the panel and in the projection screen cover. Projection screen cover 30 is also useful in protecting projection screen 20 during transportation or when the projection screen is not being used.

An embodiment of the present invention may make provision for dismounting one or more of the central and right side and left side panels from the others to permit separate use thereof as display devices. For example, one may substitute for the piano hinges at 14 and 15 in the Figs. 1 to 5 inc. embodiment suitable disengageable hinge devices, such as slip pin hinges as proposed at 85—85 in Fig. 8. The central panel 112 may have mounted to its face along the left side edge thereof a pair of pin leaves 86, 86, with the pin 87 of each extending downwardly, as shown, and along the right side edge thereof a pair of eye leaves 89, 89 with the eyes or sleeves 88, 88 thereof adapted to receive such pins 87, 87 of companion pin leaves 86, 86 mounted to the face of the left side edge of right side panel 113. The pins 87, 87 of pin leaves 86, 86 mounted on central panel 112 are adapted to be received by the eyes 88, 88 of like eye leaves 89, 89 which will be mounted to the face of the left side panel (not shown) along the right side edge thereof. Thus, by moving the right side panel 113 longitudinally upward and the left side panel longitudinally downward relative to the central panel 112 the latter may be disengaged from the other two panels so that any of the separated panels may be used as a single display panel or board.

For example, as proposed in Fig. 7, one may equip the back face of the central panel 112 with a pair of top loops 90, 90 and a pair of bottom loops 91, 91, fixed thereto. A pair of bracing brackets 92, 92 may be provided, suitably shaped from rod stock if desired, and with the upwardly-extending top end 93 of each adapted to be slipped upwardly into one of the top loops 90. The bottom end 94 of each bracket 92, which is turned upwardly as shown, is slipped up simultaneously into the bottom loop 91 aligned with the top loop 90 which is receiving the top end 93 of this bracket. Thus the pair of bracing brackets 92, 92 are removably attached to the back face of central panel 112 for bracing support thereof in a substantially upright position on a lateral supporting surface. It is to be understood that either or both of the left side and right side panels associated with central panel 112 may be equipped with bracket loops similar to 90, 90 and 91, 91 for demountable reception of like bracing brackets 92, 92 so that either one or both may serve as self-supporting display panels or boards in like fashion.

The usefulness of central panel 12 of the Figs. 1 to 5 incl. embodiment or 112 of the Figs. 7 and 8 embodiment may be enhanced by providing for mount to the back side of either of a moving strip display device, such as that proposed at 95 by way of example in Fig. 9. Such a moving strip display device 95 may comprise an open-face compartment or box having a lateral top wall 96, a lateral bottom wall 196, side-walls 97 and 197, a back wall 98 and an open front face 100. The back wall 98 may be in the form of a depending door pivotally supported from the top wall 96 by hinges 99, 99 to permit access to the interior from the back.

The device 95 is adapted to display in its open face any series message, such as a series of pictorial drawings to illustrate and emphasize the instruction being given. For example, one of the side walls, such as the nearer one 97 in Fig. 9, may have in its front edge a downwardly sloping top notch 101 and an upwardly sloping bottom notch 102. The other side wall 197 may have at the locations of such notches a pair of holes, so that the far end of one cross shaft 103 may be slipped into the top hole and its near end dropped down into top notch 101. Shaft 103 carries a roll 105 about which an elongated strip or web 107 of paper or other flexible sheet material may be wound. A similar cross shaft 104 may have its far end slipped into the bottom hole in side wall 197 and its near end moved upwardly into bottom notch 102. Bottom cross shaft 104 carries a similar roll 106, and an elastic endless belt 110 may be looped about both rolls 105 and 106 prior to insertion of the shaft ends in the notches 101 and 102 to bias them toward each and thus hold the ends of shafts 103 and 104 in these notches.

The elongated, flexible web or strip 107 may be wound up initially on bottom roll 106 with its free end trained up across the open face 100 and anchored to top roll 105, such as by being wrapped thereabout one or more times. The web or strip 107 may be transferred from the bottom roll 106 to the top roll 105 by manual engagement with the web on the front side of the top roll and the application thereto of pressure and upward motion to cause this top roll to turn clockwise as viewed in Fig. 9 and to wind up thereon more of the web. Although any suitable braking means may be employed with respect to the rolls 105 and 106, such as leaf springs dragging thereagainst, to keep the web 107 taut therebetween the elastic band effectively serves this purpose in addition to keeping the shafts 103 and 104 respectively in notches 101 and 102. Of course the web 107 may be translated across the open face 100 in either direction, i. e. either up or down, the web being transferred downward from upper roll 105 to lower roll 106 in similar fashion merely by reversing the operation, such as by applying the pressure and turning action against the lower roll and the portion of the web wound thereon.

The device 95 of Fig. 9 may be mounted on the rear face of central panel 12 or 112 in any suitable demountable fashion to permit viewing of the pictorial drawings, or other message media, on web 107 through the opening 18 from in front of the panel. For example, let it be assumed that panel 112 is perforated, i. e. provided with a plurality of holes 34—34 in pattern fashion over substantially the entire face area thereof, such as in panel 12, two of such holes being indicated in Fig. 7 above the top edge of opening 18. Hooks 108, 108 carried by or connected to the front edge of top wall 96 of device 95 (see Fig. 9) may be hooked into these particular two holes 34, 34 to suspend the device from the back of this central panel 112 (or 12 as the case may be) to display in and across the opening 18 that portion of web 107 trained across between rolls 105 and 106.

In order to make the visual aids or pictorial drawings on the web 107 observable with sharp clarity and in an attention-getting fashion the portion of the web trained across between rolls 105 and 106 may be back lighted by any suitable light source, such as the lighted candle depicted at 109 as being supported on the bottom wall 196.

The visual aid of the present invention has been primarily designed as an economical and very reasonably priced device to be used in areas where electrical power necessary to the power-operated and expensive heretofore obtainable visual aids is unavailable. For example, visual aids of the present invention are designed for use as parts of audio-visual aids which will be employed by instructors in areas of Africa to instruct the natives in mid-wife techniques and other practices and in programs for improvement of the fundamental educational and rudimentary medical standards of these remote and relatively uneducated peoples. For such purposes the visual aids must be economical to produce, versatile in use, compact and light in weight for easy transportation and readily employed to supplement in a variety of effective manners the lectures of the instructors. The illustrated embodiments of the present invention are well designed for this purpose but, of course, are not limited to such uses since they may be employed to advantage in schools and rural districts in this country.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A visual instruction aid comprising in combination; a rigid display board having an enlarged opening through which message media may be observed with relatively wide zones flanking said opening being provided with a plurality of receptacles for receiving means for attaching objects on said display board; a projection screen removably mounted across said opening; detachable fastening means for attaching and detaching said projection screen to said display board; a masking cover for said opening; a plurality of fastening means on said masking cover and on said display board for removably securing said cover to said display board; a cloth panel detachably mounted on the face of said display board; and fastening means interfitting with said receptacles for attaching objects to said display board.

2. A visual instruction aid comprising in combination; an articulated display board having three substantially rigid, upwardly-extending, rectangular panels with the central panel having an enlarged opening therein through which message media may be observed with relatively wide zones of the face of said central panel flanking said opening and areas of the faces of the side flanking panels provided with a plurality of receptacles for receiving means for attaching objects on said display board; a projection screen removably mounted across said opening; detachable fastening means on said central panel and on said projection screen for attaching and detaching said projection screen to said central panel; a cloth panel detachably mountable on the face of one of said rigid panels; fastening means interfitting with said receptacles for attaching objects to said display board; and hinge means pivotally connecting side edges of said central panel to juxtaposed side edges of said flanking side panels at least temporarily to permit lap folding of said panels together.

3. A visual instruction aid comprising in combination; an articulated display board having three substantially rigid, upwardly-extending, rectangular panels with the central panel having an enlarged opening therein through which message media may be observed with relatively wide zones of the face of said central panel flanking said opening and areas of the faces of the two side flanking panels being provided with a plurality of perforations for receiving removable means for attaching objects on said display board; removable fastening means for engagement in the perforations for attaching objects to said panels; a projection screen removably mounted across said opening; detachable fastening means on said central panel and on said projection screen for attaching and detaching said projection screen to said central panel; a cloth panel detachably mountable on the face of one of said flanking side panels; a turn-back chart detachably mounted on the face of the other of said flanking side panels; and hinge means pivotally connecting at least temporarily side edges of said central panel to juxtaposed side edges of said flanking side panels at least temporarily to permit lap folding of said panels together.

4. A visual instruction aid comprising in combination; a unitary rigid transportable display board of lightweight material provided with a plurality of receptacles for receiving a plurality of clips for attaching objects to said display board; an opening provided within said display board; a projection screen removably mounted across said opening; fastening means for attaching and detaching said projection screen to said display board; a projection screen cover; a plurality of fastening means on said cover and on said screen for removably securing said cover to a side of said screen; a plurality of receptacles for receiving a plurality of clips for fastening objects to said projection screen cover; a plurality of clips interfitted with said receptacles of said display board and said cover for mounting objects on said display board and said cover; means for removably mounting a plurality of cloth boards on said display board; means for detachably mounting a turn-back chart on said display board; a plurality of hinge means for interfolding a plurality of panels of said display board for transporting said display board; and a handle for carrying said display board.

5. A visual instruction aid comprising, in combination; a substantially rigid, rectangular, display panel having an enlarged opening therein through which message media may be observed with relatively wide zones of the face of said panel flanking said opening being provided with a plurality of perforations; a plurality of removable fastening means for engagement in the perforations for attaching objects to the face of said panel; a projection screen to cover said opening; detachable fastening means on the back of said panel and on said screen temporarily to secure said screen across said opening; means detachably connectable to said panel to hold it upright; and open-face compartment detachably mountable to the back of said panel with the open face thereof aligned with said opening; web translating means carried by said compartment providing a translatable run of a message media-bearing web across the compartment open face for viewing through said panel opening.

References Cited in the file of this patent

UNITED STATES PATENTS

| | | |
|---|---|---|
| 863,670 | Summers | Aug. 20, 1907 |
| 1,714,550 | Dreher | May 26, 1929 |
| 2,121,898 | Young | June 28, 1938 |
| 2,474,447 | Wheelock | June 28, 1949 |
| 2,528,311 | Hurley | Oct. 31, 1950 |
| 2,547,259 | Engelhardt | Apr. 3, 1951 |
| 2,730,011 | Kleinhample | Jan. 10, 1956 |